United States Patent [19]

Hoffa

[11] Patent Number: 5,067,438
[45] Date of Patent: Nov. 26, 1991

[54] FISH AQUARIUM

[76] Inventor: Gary Hoffa, 7545 University Ave., La Mesa, Calif. 91941

[21] Appl. No.: 637,541

[22] Filed: Jan. 4, 1991

[51] Int. Cl.⁵ .............................................. A01K 63/00
[52] U.S. Cl. ............................................ 119/5; 30/101
[58] Field of Search ............... 119/5, 3; D30/101–107

[56] References Cited

U.S. PATENT DOCUMENTS

| | | | |
|---|---|---|---|
| 3,091,220 | 5/1963 | Willinger et al. | 119/5 |
| 3,696,789 | 10/1972 | Richard | 119/5 |
| 3,908,598 | 9/1975 | Jewson | 119/5 |
| 4,516,529 | 5/1985 | Lotito | 119/5 |
| 4,951,607 | 8/1990 | Lapeyre | 119/5 |

FOREIGN PATENT DOCUMENTS 7408464  6/1974  Netherlands ............................. 119/5

Primary Examiner—John G. Weiss
Attorney, Agent, or Firm—Charles C. Logan, II

[57] ABSTRACT

A fish aquarium having structure that produces an improved display for fish and other objects contained therein. The front wall is formed of a transparent material and it has a vertically oriented lower section, a vertically oriented upper section and an angularly oriented central section that connects the upper and lower sections that are laterally offset a predetermined distance from each other. The angularly oriented central section along with the water in the aquarium produces an optical illusion that the material and objects supported in the bottom of the aquarium have a front to rear upwardly oriented appearance. A hermetically sealed elongated light housing is mounted inside the aquarium adjacent the intersection of its top wall and the upper section of its front wall. The florescent lamp in the light housing directs all of its light only in the downward and rearwardly direction which prevents the production of a glare off the water that normally strikes the eyes of a person peering into the aquarium.

5 Claims, 2 Drawing Sheets

FISH AQUARIUM

BACKGROUND OF THE INVENTION

The invention relates to a fish aquarium whose front wall has a novel configuration and which has a hermetically sealed elongated light housing mounted inside the aquarium adjacent the intersection of its top wall and the upper section of its front wall.

The present state of the art in fish aquarium tanks is rather standard. They are generally rectangular in configuration and have a vertical front wall. Also the front wall, rear wall, top wall, bottom wall and end walls are normally made of transparent material. The top wall generally has a cutout portion that provides access to the interior of the aquarium tank. This cutout portion is often covered by a lamp housing having a bottom wall that is transparent that allows the light from the florescent lamp fixture therein to be directed downwardly onto the top surface of the water in the aquarium. Some of this light that is directed toward the water is reflected outwardly through the front wall of the aquarium and its glare is highly objectionable to presons peering into the interior of the aquarium. In fish stores, this light housing needs to be moved rearwardly every time one of the fish in the tank are sold or when any maintenance within the tank is undertaken.

It is an object of the invention to provide a novel fish aquarium that has a transparent front wall that eliminates the normal glare from a lamp positioned above the top wall of the aquarium.

It is also an object of the invention to provide a novel fish aquarium that has a hermetically sealed light housing positioned within the interior of the aquarium tank itself.

It is another object of the invention to provide a novel fish aquarium that has most of its walls formed of an opaque material.

It is an additional object of the invention to provide a novel fish aquarium that is economical to manufacture and market.

It is a further object of the invention to provide a novel fish aquarium that eliminates the need for an external light source.

SUMMARY OF THE INVENTION

Applicant's novel fish aquarium has a front wall made of transparent material having the vertically oriented lower section, a vertically oriented upper section and an angularly oriented central section that connects the upper and lower sections due to their being laterally offset from each other. The rear wall, the bottom wall, and the end walls are preferrably made of an opaque acrylic material. The top wall is also made of an opaque material and it has a front lip that extends downwardly over the front surface of the upper section of the transparent front wall.

A hermetically sealed elongated light housing is mounted inside the aquarium adjacent the intersection of its top wall and the upper section so the front wall. A florescent light is mounted in this light housing and access for changing this light bulb would be through an aperture in one of the end walls of the aquarium. This aperture is generally closed by an end cover panel. The electrical conductor wires of the florescent lamp pass through an aperture in the rear wall of the light housing and then through a channel formed in a block of plastic material whose rear end is aligned with an aperture in the rear wall of the aquarium. The electrical cord of the florescent light fixture is hermetically sealed from the interior of the aquarium.

There is a cutout portion in the top wall of the aquarium and a cover is removably received therein.

It has been found that the previously described fish aquarium displays nicely on stepped shelves. The fish aquarium mounted on the upper shelf also has a front wall of transparent material. This front wall has a vertically oriented lower section and a vertically oriented upper section that are connected by an angularly oriented central section. The upper tank has its angularly oriented section sloped outwardly from bottom to top, whereas the lower aquarium has its angularly oriented central section sloping rearwardly from front to rear.

Another embodiment of the novel fish aquarium has both the front and rear walls formed of a transparent material. These respective walls also have a vertically oriented lower section and vertically oriented upper section that are connected together by an angularly oriented central section. In this structure both of these central sections slope outwardly from bottom to top. A pair of hermetically sealed elongated light housings are mounted within the aquarium adjacent the intersection of the top wall and the respective upper sections of the front and rear walls. An additional hermetically sealed elongated light housing may be supported from the bottom surface of the top cover intermediate its front and rear edges.

DESCRIPTION OF THE PREFERRED EMBODIMENT

Referring to FIGS. 1-5 of the drawings, the novel fish aquarium will now be described.

Figure 1:
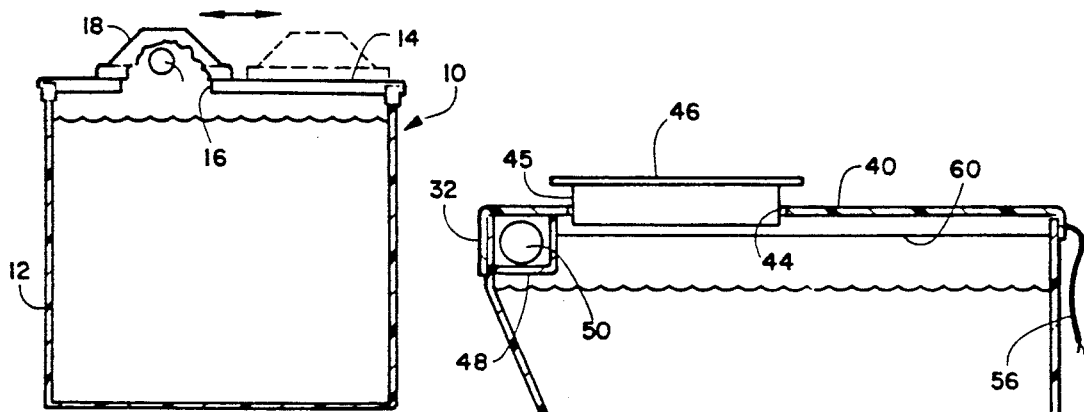
FIG. 1 is a side elevation view of the existing prior art fish aquarium.

In FIG. 1, a side elevation view illustrates the existing prior art fish aquariums 10. They have a transparent front wall and a top wall 14 having a cutout portion 16. The light housing 18 having a florescent light 20 normally rests over opening 16. when a person desires to gain access to the interior of the fish aquarium 10, the light housing 18 is moved rearwardly to its dotted position. While in its position over the opening 16, some of the light rays are reflected so that they travel outwardly through the front wall 12 and into the eyes of persons peering into the interior of the fish aquarium.

The inventor's novel fish aquariums 24 and 26 are preferrably mounted on shelves 27 and 28 when used together in a persons's home or a fish store. Aquarium 24 has a front wall 30 made of transparent material. Front wall 30 has a lower section 31, an upper section 32, and a central section 33. Rear wall 35, bottom wall 36, end walls 38 and 39 and top wall 40 are preferrably made of a opaque material such as acrylic plastic. Top wall 40 has a lip 42 that covers upper section 32 and prevents illumination from passing therethrough since it is made of an opaque material. A fish access cutout portion 44 is formed in top wall 40. A cover 46 having downwardly extending flanges 45 is detachably received in cutout portion 44. A light housing 48 extends from one end wall 38 to the other end wall 39 and it is hermetically sealed to prevent water or moisture getting into florescent bulb 50. The rear wall 51 of light housing 48 has an aperture 52 throughwhich passes the cord 56 of the florescent lamp. Cord 56 also passes through the channel 58 in a block of plastic 60 whose opposite ends align with apertures 52 and 62. Channel 58 would be hermetically sealed against water or moisture from the interior of the fish aquarium.

Fish aquarium 24 has a depth X and a width Y. Upper section 32 is laterally offset from lower section 31 by a distance D.

An aperture 64 is formed in end wall 38 so that the florescent bulb 50 may be changed when necessary. A cover panel 65 detachably closes opening 64.

Figure 2:
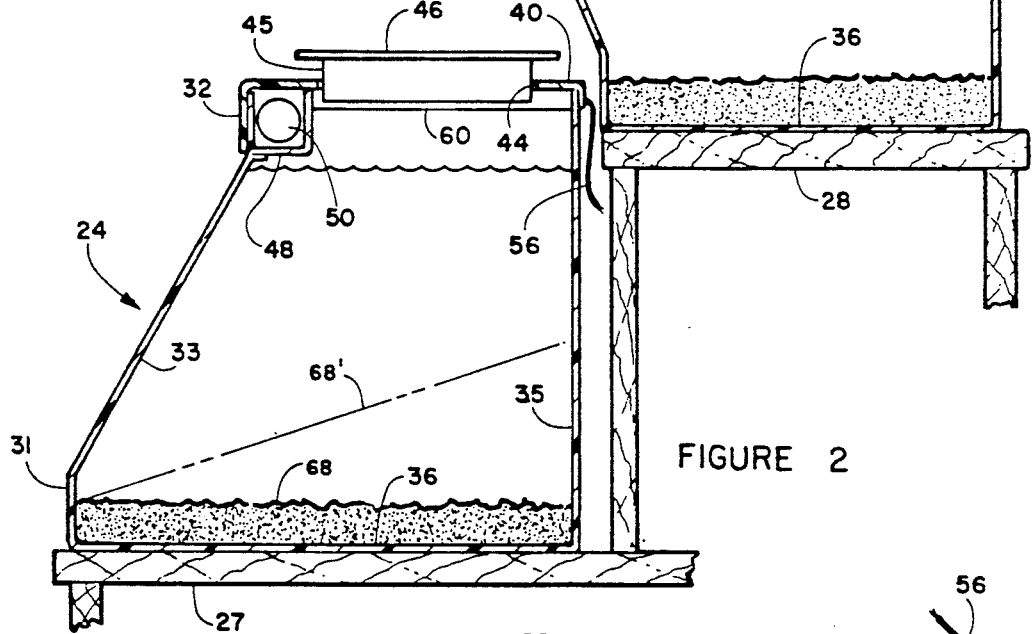
FIG. 2 is a side elevation view of the inventor's novel fish aquarium showing both a lower mounted unit and and an upper mounted unit.
Figure 3:
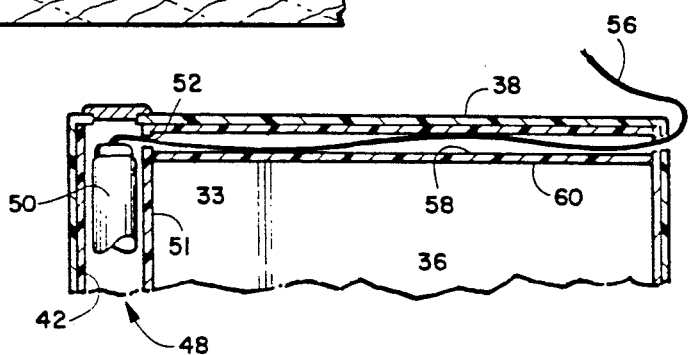
FIG. 3 is a front perspective view of one of the lower mounted fish aquariums.
Figure 4:
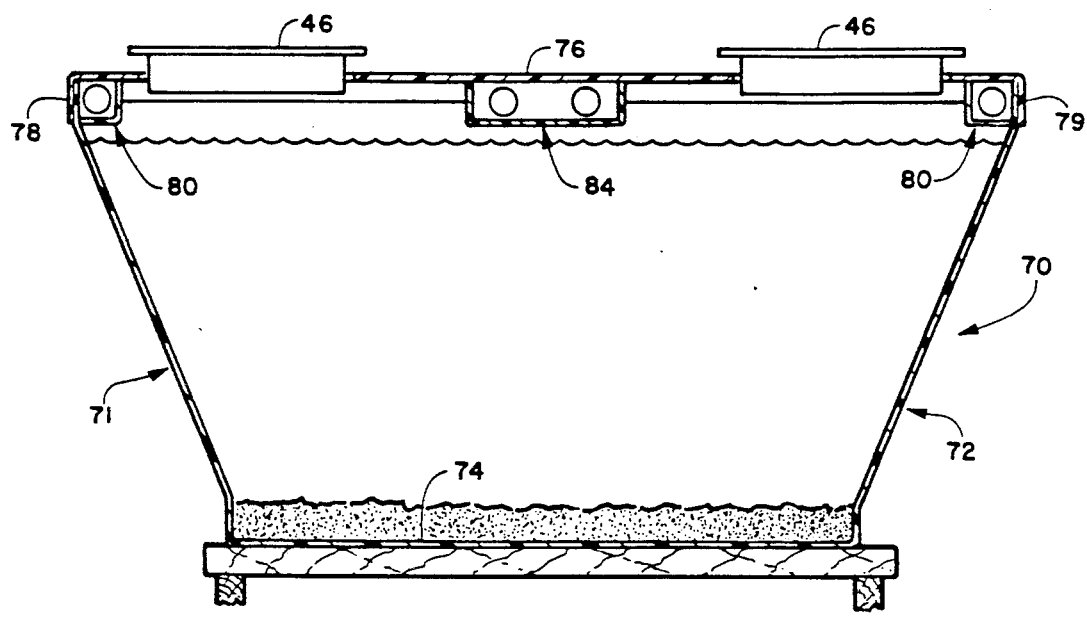
FIG. 4 is a partial top plan view that is broken away to show the interior of the light housing and its associated structure.

Due to the angular inclination of front wall 30 the sand 68 and other objects on the inside surface of bottom walls 36 give a visual appearance of being sloped from front to rear (see dotted line 68 in FIG. 2).

Fish aquarium 26 is substantially identical to fish aquarium 24 except that is central portion 33 is angularly oriented rearwardly from top to bottom.

Figure 5:
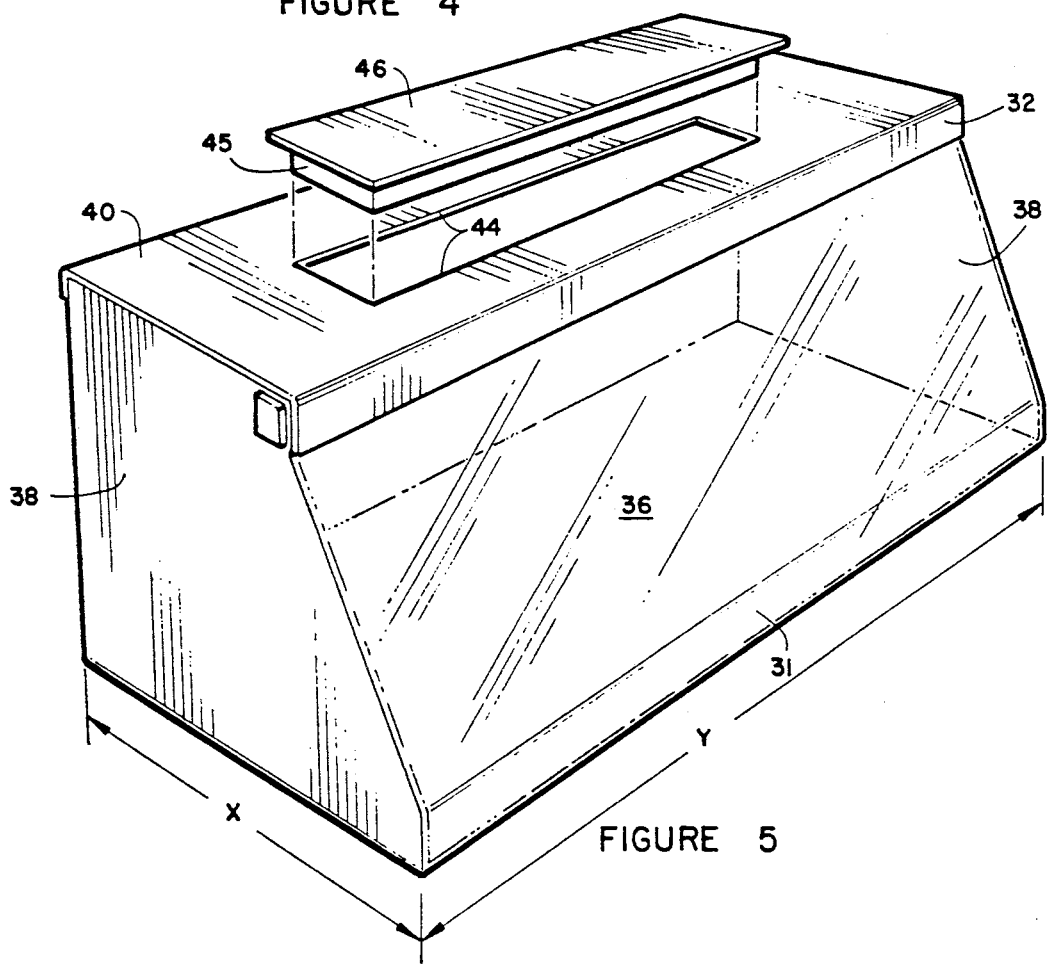
FIG. 5 is a side elevation of an alternative embodiment of the novel fish aquarium.

An alternative embodiment fish aquarium 70 is illustrated in FIG. 5. It has a front wall 71 and a rear wall 72 that are similar to previously described front wall 26. The bottom wall 74, the top wall 76, and the end walls (not shown) would all be made of an opaque material. Top wall 76 has downwardly extending lips 78 and 79 that prevent the light from light housings 80 from passing outwardly through the respective upper sections of walls 71 and 72. The electrical cords from the florescent lamps in these light housings would pass through apertures formed in one of the end walls. An additional hermetically sealed light housing 84 could be mounted on the bottom surface of top wall 76. Top wall 76 would have cutout portions and covers similar to those described previously in the first embodiment.

I claim:

1. A fish aquarium comprising:

an elongated bottom wall having a front edge, a rear edge, side edges, a depth X and a width Y;

an upright oriented rear wall having a width Y connected to the rear edge of said bottom wall;

an upright oriented transparent front wall having a width Y connected to the front edge of said bottom wall, said front wall having a vertically oriented lower section and a vertically oriented upper section, said lower section being laterally offset a predetermined distance D from said upper section and an angularly oriented central section that connects said upper and lower sections;

a pair of end walls that are connected to the respective side edges of said bottom wall;

a top wall having a bottom surface that is secured to the top edges of said front wall, said rear wall, and said end walls. said top wall having a cutout portion that detachably receives a cover; and a hermetically sealed elongated light housing that is mounted inside said aquarium adjacent the intersection of said top wall and the upper section of said front wall, said light housing extends across the entire width W of said aquarium, an electrical cord in said light housing and waterproofing means for passing the electrical cord through said aquarium from said light housing to the rear wall of said aquarium.

2. A fish aquarium as recited in claim 1 wherein said light housing has a transparent bottom wall.

3. A fish aquarium as recited in claim 1 wherein the top wall of said aquarium is formed of opaque material and it has a flange of opaque material that extends downwardly over the upper section of said front wall to prevent transmission of light therethrough.

4. A fish aquarium as recited in claim 3 wherein the rear wall, bottom wall and end walls of said aquarium are made of opaque material.

5. A fish aquarium as recited in claim 1 wherein said rear wall is made of transparent material having a vertically oriented lower section and a vertically oriented upper section. said lower section being laterally offset a predetermined distance D from said upper section and an angularly oriented central section connects said upper and lower sections.

* * * * *